US009742707B2

United States Patent
Tsirkin et al.

(10) Patent No.: US 9,742,707 B2
(45) Date of Patent: Aug. 22, 2017

(54) SWITCHING OF A TRANSMIT QUEUE ASSOCIATED WITH A VIRTUAL MACHINE

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 1137 days.

(21) Appl. No.: 13/253,615

(22) Filed: Oct. 5, 2011

(65) Prior Publication Data

US 2013/0089106 A1 Apr. 11, 2013

(51) Int. Cl.
*H04L 12/28* (2006.01)
*H04L 12/861* (2013.01)
*H04L 12/879* (2013.01)

(52) U.S. Cl.
CPC ........ *H04L 49/9057* (2013.01); *H04L 49/901* (2013.01)

(58) Field of Classification Search
USPC ....................................................... 370/412
See application file for complete search history.

(56) References Cited

U.S. PATENT DOCUMENTS

| | | | | |
|---|---|---|---|---|
| 2002/0069388 | A1* | 6/2002 | Niu et al. | 714/748 |
| 2009/0135844 | A1* | 5/2009 | Mukherjee | H04L 12/5693 370/417 |
| 2012/0026542 | A1* | 2/2012 | Kobayashi | G06F 3/1206 358/1.15 |
| 2012/0033673 | A1* | 2/2012 | Goel | 370/400 |
| 2012/0057458 | A1* | 3/2012 | Motwani | 370/235 |
| 2012/0218595 | A1* | 8/2012 | Miyazawa | G06F 3/126 358/1.15 |

\* cited by examiner

*Primary Examiner* — Gregory Sefcheck
*Assistant Examiner* — Majid Esmaeilian
(74) *Attorney, Agent, or Firm* — Lowenstein Sandler LLP (57) ABSTRACT

Methods and systems for managing multiple transmit queues of a networking device of a host machine in a virtual machine system. The networking device includes multiple transmit queues that are used by multiple guests of the virtual machine system for the transmission of packets in a data communication. A hypervisor of the virtual machine system manages the switching from one or more transmit queues (i.e., old transmit queues) to one or more other queues (i.e., new transmit queues) by managing a flow of packets in the virtual machine system to maintain a proper sequence of packets and avoid a need to re-order the transmitted packets at a destination.

15 Claims, 6 Drawing Sheets

| TRANSMISSION QUEUE LIST (at T2 > Ti) ||
|---|---|
| At Ti, instruction received to switch VM1 from Q1, Q2, and Q3 (old transmit queues) to QN (new transmit queue) <br><br> At T2, a new packet (Packet 3) is passed to the hypervisor for transmission ||
| Path Identifier | Outstanding Packet(s) |
| VM1-Q1 | Packet 1 |
| VM1-Q2 | Packet 2 |
| VM1-Q3 | Packet 3 |

FIGURE 3B

| TRANSMISSION QUEUE LIST (at T3 > T2) ||
|---|---|
| At T3, Packet 1 transmitted from Q1 (one of the old transmit queues associated with VM1) ||
| Path Identifier | Outstanding Packet(s) |
| VM1-Q2 | Packet 2 |
| VM1-Q3 | Packet 3 |
| VM2-QN | Packet A |

FIGURE 3C

| TRANSMISSION QUEUE LIST (at T4 > T3) ||
|---|---|
| At T4, Packet 3 transmitted from Q3 (one of the old transmit queues associated with VM1) ||
| Path Identifier | Outstanding Packet(s) |
| VM2-QN | Packet A |
| VM2-QN | Packet B |

SWITCHING OF A TRANSMIT QUEUE ASSOCIATED WITH A VIRTUAL MACHINE

TECHNICAL FIELD

Embodiments of the present invention relate to a computer system, and more specifically, to network device management in a virtual machine system.

BACKGROUND

Virtualization allows multiplexing of an underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

One such resource managed by the host computer is a networking device that may be used by multiple guests operating (i.e., virtual machines) at the same time. Each guest or virtual machine is assigned a different and unique network address, such as a virtual LAN (VLAN) tag and/or a media access control (MAC) address, or some other combination of data in a packet header. The networking device has multiple queues for managing incoming packets to be received by a virtual machine and outgoing packets transmitted by a virtual machine. Dedicated queues may be used which are mapped to a specific hardware address and dedicated to a specific virtual machine. In addition, shared queues may be employed which are shared by multiple virtual machines. However, the management of the multiple dedicated and shared queues of the virtual machine system creates a significant administrative burden for the host computer administrator including the continual monitoring, evaluating and re-allocating of the queues based on the frequently changing queue activity.

When a packet is received in a shared queue, the host computer needs to look at the received packet in order to determine which guest (virtual machine) should receive the packet. As such, the packet can not be placed directly into a memory of the guest virtual machine for which it is intended. Instead, the host computer must make a copy of the packet, thereby expending additional computational and storage resources.

When a packet to be transmitted is placed in a shared queue, the host computer must examine the packet in order to validate the address. This can cause contention between multiple virtual machines seeking to utilize the same shared queue and creates a bottleneck negatively effecting network performance.

In addition, there may be a need to switch a virtual machine and its one or more associated transmit paths from one transmit queue (i.e., an old queue) to another transmit queue (i.e., a new queue). However, if the virtual machine system immediately executes the switch there may be packets that are outstanding on the old queue (i.e., the packets transmitted by the one or more virtual machine addresses affected by the switch which have been provided to a network device for transmission, but not yet transmitted). Accordingly, if the switch occurs automatically without regard to the outstanding packets on the old queue, then packets may be transmitted on the new queue before the outstanding packets are transmitted from the old queue, resulting in an out-of-sequence transmission of packets and a need to re-order the packets at the destination.

DETAILED DESCRIPTION

Methods and systems for managing multiple transmit queues of a networking device of a host machine in a virtual machine system. The methods and systems of the present invention provide for the dynamic management of the multiple transmit queues, wherein the transmit queue switching is performed without interrupting or stopping the normal transmit packet processing. The networking device includes transmit queues that are used by multiple virtual machines (VM) and associated guests of the virtual machine system for the transmission of packets in a data communication. A hypervisor of the virtual machine system manages the switching from one or more transmit queues (i.e., the "old queue(s)" or "old transmit queue(s)" or "Q1, Q2, etc.") to one or more other queues (i.e., the "new queue" or "new transmit queue" or "QN1, QN2, etc.") by managing a flow of packets in the virtual machine system to maintain a proper sequence of packets and avoid a need to re-order the transmitted packets at a destination.

In an embodiment, the hypervisor monitors the transmit paths of the virtual machine system. A transmit path may be specified by a virtual machine address (i.e., a source of the transmission) and an associated transmit queue (e.g., VM1-Q1). One having ordinary skill in the art will appreciate that a transmit path may also be defined using any suitable path identifying information, including, but not limited to, an IP address and/or a port address.

In an embodiment, the hypervisor processes an instruction to switch the association of a virtual machine address from an old transmit queue (Q1) to a new transmit queue (QN). Upon receipt by the hypervisor of a new packet for transmission, the hypervisor determines whether there are any packets in the old transmit queue transmitted by the virtual machine address affected by the switch that have been passed to a network device managing the queues, but have not yet been transmitted (herein referred to as one or more "outstanding packets"). If there are one or more outstanding packets, the hypervisor generates a transmission queue list including the one or more identified outstanding packets, appends the new packet to a tail of the transmission queue list, and builds the transmission queue list on top of the new transmit queue. Subsequently, upon receipt of a notification from the network device that a packet has been transmitted from the old transmit queue (herein a "transmitted packet"), the hypervisor determines whether there are any outstanding packets on the transmission queue list. If no outstanding packets remain on the transmission queue list, the hypervisor executes the switch of the virtual machine to the new queue and transmit any packets previously queued in the new queue.

In an embodiment, the one or more outstanding packets in the old transmit queue may be cloned (i.e., copied) to the new transmit queue. The cloned packets may then be transmitted from the new transmit queue along with any network packets received from a transmit path associated with the virtual machine.

In an example described herein, a virtual machine ("VM1") having three associated transmit paths (VM1-Q1, VM1-Q2, and VM1-Q3) is being switched from old transmit queues (Q1, Q2, and Q3) to a new transmit queue (QN). This example illustrates an embodiment for switching multiple shared transmit queues (Q1, Q2, and Q3) to a dedicated transmit queue (QN). One having ordinary skill in the art will appreciate that the example is presented for illustration purposes, and is not intended to limit the scope of the embodiments described herein. For example, one having ordinary skill in the art will appreciate that the virtual machine (VM1) may have any number of old transmit queues and transmit paths that are being switched to any number of new transmit queues. In addition, one having ordinary skill in the art will appreciate that the system and method described herein may be used for the switching of one or more shared transmit queues to a dedicated transmit queue (as in the example) and the switching of a dedicated transmit queue to one or more shared queues. Furthermore, one having ordinary skill in the art will appreciate that the system and method described herein may be used for switching one or more shared transmit queues to one or more other shared transmit queues, or for switching a dedicated transmit queue to another dedicated transmit queue.

Throughout the following description, the term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Accordingly, an efficient method and system is provided that optimizes the switching from an old transmit queue to a new transmit queue in a virtual machine system. The described switching management provides for a virtual machine system wherein a proper sequence of packets is transmitted, thereby avoiding the need to re-order the transmitted packets at a destination.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
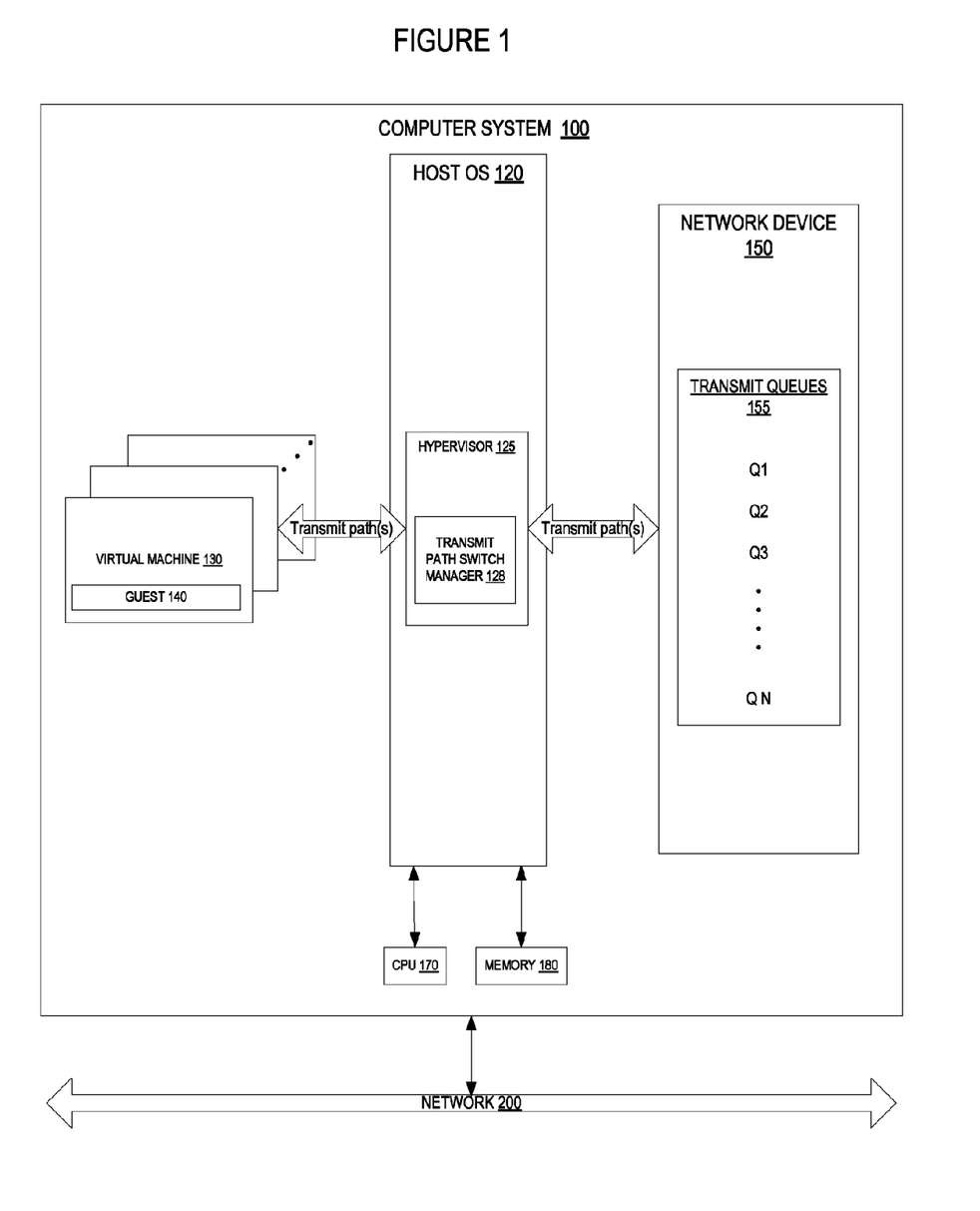
FIG. 1 is a block diagram of a virtual machine system that hosts multiple guests, according to an embodiment of the invention.

FIG. 1 is a block diagram that illustrates an embodiment of a computer system 100 in which embodiments of the present invention may operate. The computer system 100 hosts multiple virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 125 to virtualize access to the underlying host hardware, making the use of the virtual machine 130 transparent to the guest 140 and the users of the computer system 100. In one embodiment, the hypervisor 125 may support multiple virtual machines 130. In one embodiment, the hypervisor 125 is part of a host operating system (OS) 120.

In one embodiment, the computer system 100 is accessible by remote systems via a network 200. The network 200 may be a private network (e.g., a local area network (LAN), a wide area network (WAN), intranet, etc.) or a public network (e.g., the Internet).

The computer system 100 also includes hardware components such as one or more physical central processing units (CPUs) 170, memory 180, and other hardware components. In one embodiment, the computer system 100 also includes a network device 150 communicatively coupled to the guest 140 via transmit paths managed by the hypervisor 125. During operation, each guest 140 interacts with the host OS 120 via a virtual machine 130 having a specific network address (herein the "virtual machine address"). The virtual machine address may be any suitable protocol or format, including a virtual LAN (VLAN) tag and/or a media access control (MAC) address. Each virtual machine address is assigned to one or more of the transmit queues 155 (i.e., Q1, Q2, Q3, . . . QN) maintained by the network device 150. One having ordinary skill in the art will appreciate that the transmit queues 155 may be a collection of dedicated queues and shared queues.

According to one embodiment of the present invention, the hypervisor 125 includes a transmit path switch manager 128 configured to manage the switching of one or more transmit queues 155 assigned to the one or more quests 140 from an old transmit queue to a new transmit queue according to the methodology described in detail below in connection with FIG. 4.

Figure 2:
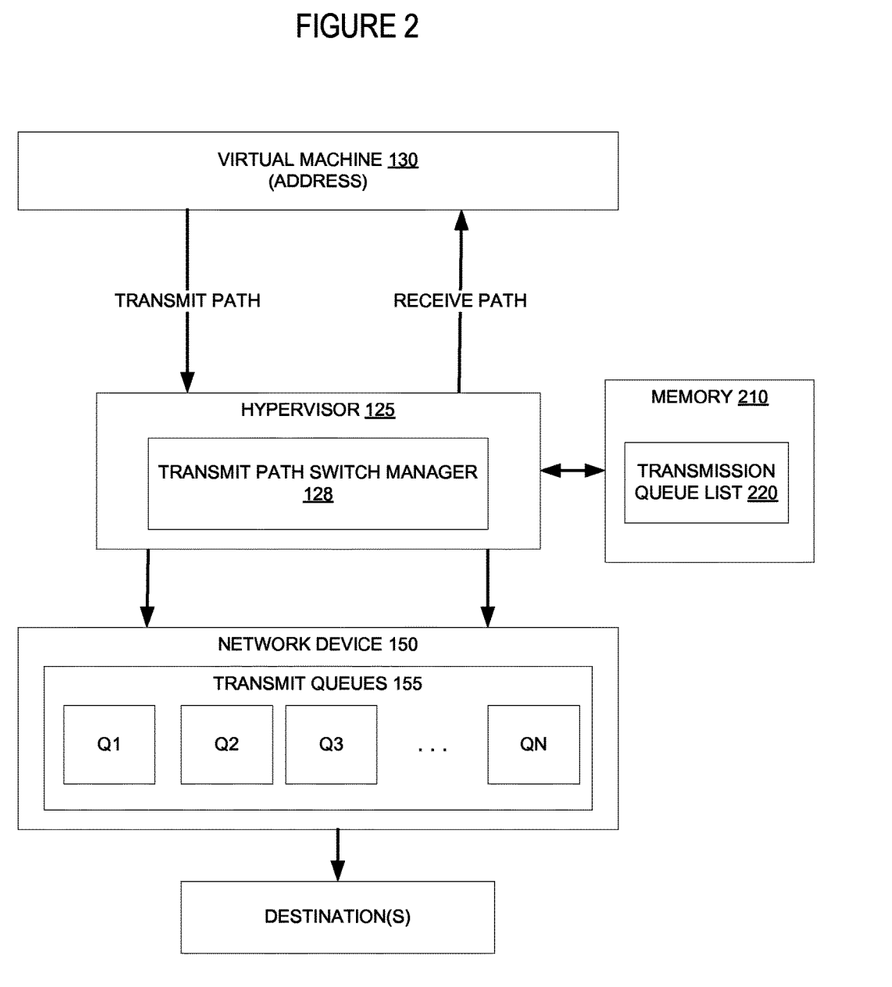
FIG. 2 is a block diagram of a hypervisor, a network device, and a virtual machine in a virtual machine system, according to an embodiment of the invention.

FIG. 2 is a block diagram of an exemplary hypervisor 125, a network device 150, and a virtual machine 130 in a virtual machine system, according to one embodiment of the invention. As shown in FIG. 2, the hypervisor 125 includes a transmit path switch manager 128 configured to manage the switching of one or more transmit paths associated with a virtual machine to one or more selected transmit queue, according to the exemplary process flow described below in connection with FIG. 4. The transmit path switch manager 128 is connected to a memory 210 associated with the hypervisor 125. The memory 210 is configured to store a transmission queue list 220, examples of which are shown in FIGS. 3A-3C.

Figure 3A:
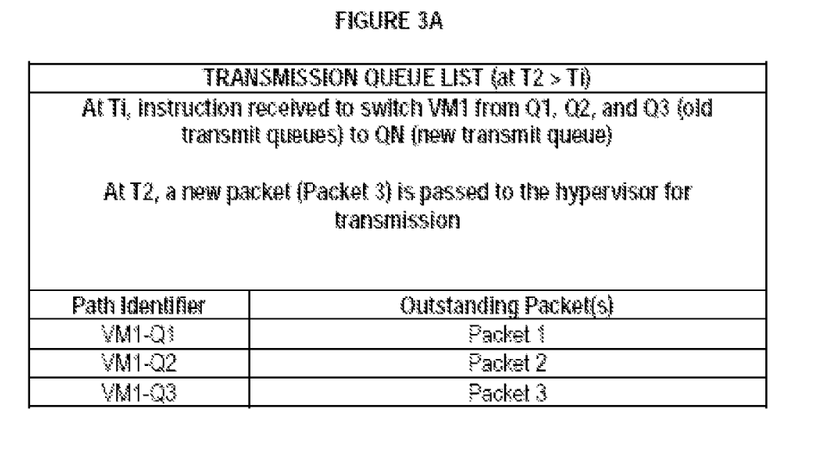
FIGS. 3A-3C illustrates exemplary queue data managed by a transmit path switch manager at selected times during a transmit queue switching process according to an embodiment of the invention.
Figure 3B:
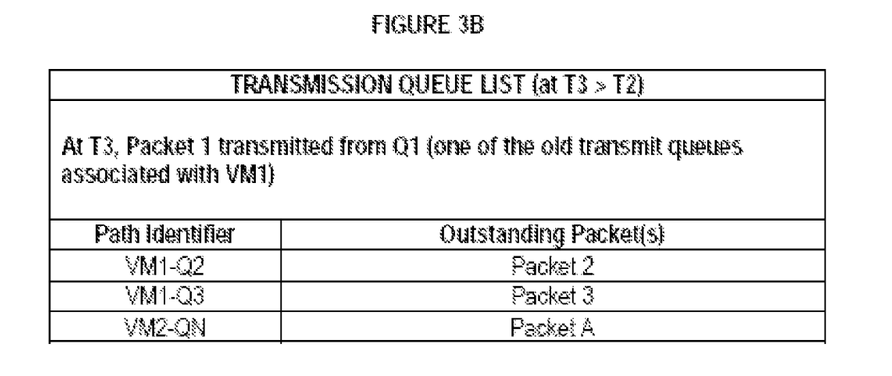
Figure 3C:
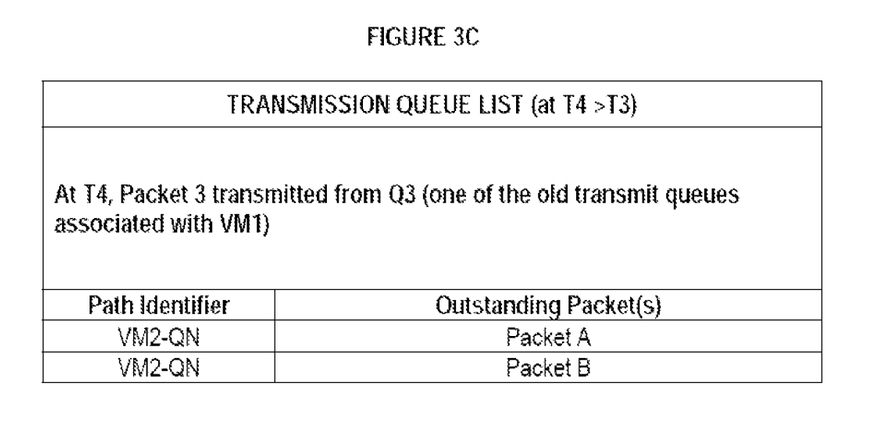

FIGS. 3A-3C illustrates queue data managed by a transmit path switch manager at selected times during an exemplary transmit queue switching process. As shown in FIGS. 3A-3C, the transmission queue list 220 includes a listing of packets in the old transmit queue that have been passed to the network device 150, but have not yet been transmitted to a destination. One having ordinary skill in the art will appreciate that the transmission path queue list 220 may include additional information relating to the transmit queues, the transmit queue assignments, the packets being processed by the transmit queues, the virtual machines, and the like that may be monitored and tracked by the transmit path switch manager 128.

FIG. 3A illustrates the queue data at a time (T2) after a time an instruction to switch the transmit queues is processed by the hypervisor 125, according to the example. The time the instruction is processed is referred to herein as "Ti".

FIG. 3B illustrates the queue data at a time after T2 (referred to as "T3") wherein a packet (Packet 1) is transmitted from an old transmit queue (Q1) associated with an exemplary virtual machine (VM1), according to the example.

FIG. 3C illustrates the queue data at a time after T3 (referred to as "T4") wherein a packet (Packet 3) is transmitted from one of the old transmit queues (Q3) associated with the virtual machine (VM1), according to the example.

Figure 4:
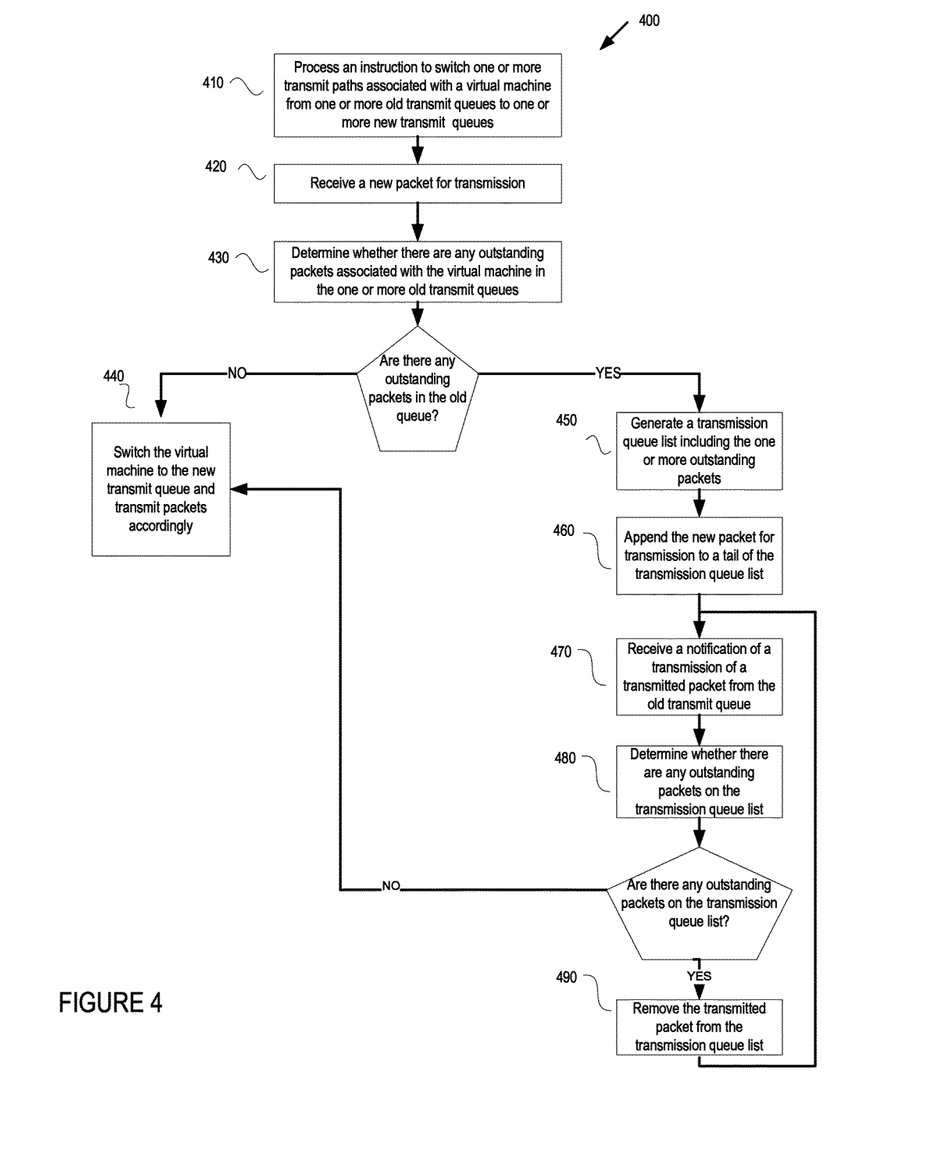
FIG. 4 is a flow diagram of one embodiment of a method for switching transmit queues in a virtual machine system.

FIG. 4 is a flow diagram illustrating one embodiment of a method 400 for dynamically managing multiple transmit queues of a virtual machine system, without interrupting or stopping the normal transmit packet processing. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 400 is performed by the transmit path switch manager 128 of the hypervisor 125 of FIG. 1 and FIG. 2.

Referring to FIG. 4, in one embodiment, the method 400 begins when the transmit path switch manager 128 processes an instruction provided by the hypervisor 125 to switch one or more transmit paths associated with a virtual machine from one or more old queues to one or more new queues, in block 410. One having ordinary skill in the art will appreciate that the switch instruction may be provided by a separate module of the computer system 100, or could be an administrative command provided by a host system administrator, or some other source. In the described example, the transmit path switch manager 128 processes an instruction received at a time (Ti) to switch virtual machine (VM1) from old transmit queues (Q1, Q2, and Q3) to a new transmit queue (QN). In the example, the transmit paths associated with VM1 are referred to as VM1-Q1, VM1-Q2, and VM1-Q3.

The transmit path switch manager 128 subsequently receives a new packet for transmission (e.g., Packet 3 shown in FIG. 3A) in block 420, and determines whether there are any outstanding packets associated with the virtual machine affected by the switch instruction in the old transmit queue (i.e., packets passed to the network device, e.g., network device 150 in FIG. 1 and FIG. 2, that have yet to be transmitted to the destination), in block 430. If there are no outstanding packets in the one or more old transmit queues, then the transmit path switch manager 128 switches the virtual machine to the new transmit queue and transmits packets accordingly, in block 440. Optionally, prior to transmitting the packets from the new transmit queue, the transmit path switch manager 128 may compare a size of the new transmit queue to a threshold value. The size of the transmission queue list may be measured in any suitable manner, including, for example, a sum of packet lengths, a number of packets, or a total number of scatter/gather entries. The threshold value may be any metric used by the transmit path switch manager 128 in the comparison with the new transmit queue size, including, but not limited to, a capacity of the new queue. If the size of the new transmit queue is greater than or equal to the threshold value, then the transmit path switch manager 128 may discard one or more packets from a head of the new transmit queue until the size of the new transmit queue matches the threshold value to avoid overloading the transmit queue.

In the example, if there are no outstanding packets in the one or more old queues (e.g., Q1, Q2, and Q3), then the transmit path switch manager 128 determines that the outstanding packets have all been transmitted to the destination and that transmission for VM1 may be switched to the new transmit queue (e.g., QN), in block 440. Confirmation that the outstanding packets have been transmitted indicates that the switch is appropriate and that the packets are transmitted in the proper sequence and will not need to be re-ordered by the destination.

If there are outstanding packets in the old transmit queue then the transmit path switch manager 128 generates a transmission queue list 220 including the one or more outstanding packets, in block 450. In addition, the transmit path switch manager 128 appends the new packet (e.g., Packet 3) to the tail of the transmission queue list. In the given example, as shown in FIG. 3A, at a time (T2) after the switch instruction time (Ti), the transmit path switch manager 128 receives Packet 3, determines there are outstanding packets (Packet 1 and Packet 2) in the old transmit queues associated with VM1, and generates the transmission queue list 220 with Packet 3 appended to the tail, as shown in FIG. 3A.

In an embodiment, following the identification of outstanding packets in the old transmit queue in block 430 and as an alternative to blocks 450-490, the transmit path switch manager 128 may clone (i.e., copy) the one or more outstanding packets in the old transmit queue to the new transmit queue. The cloned packets may then be transmitted from the new transmit queue along with any network packets received from a transmit path associated with the virtual machine.

In block 470, the transmit path switch manager 128 receives a notification from the network device that a packet has been transmitted from the old transmit queue (i.e., a transmitted packet). In block 480, the transmit path switch manager 128 determines whether there are any outstanding packets on the transmission queue list. In the example, as shown in FIG. 3B, at time (T3) the transmission queue list 220 is updated to remove Packet 1 from the list, leaving Packet 1 and Packet 2 on the transmission queue list 220. It is noted that the transmission queue list 220 shown in FIG. 3B further reflects that Packet A has been received from a transmit path (i.e., VM2-QN) of the new transmit queue, and as such, is not an outstanding packet associated with the old transmit queue.

If in block 480 it is determined by the transmit path switch manager 128 that there are no outstanding packets on the transmission queue list 220, then method 400 continues to block 440 and the transmit queue switch manager 128 switches the virtual machine to the new transmit queue.

If in block 480 it is determined by the transmit path switch manager 128 that there are outstanding packets on the transmission queue list 220, then the transmit path switch manager 128 removes the transmitted packet from the transmission queue list 220 (if applicable), in block 490. Following block 490, the method 400 continues to block 470 where the transmit path switch manager 128 awaits receipt of a further notification from the network device of a transmission of a packet from the old transmit queue. In an embodiment, the method continues in the iterative manner illustrated in FIG. 4 until the transmission queue list 220 no longer includes any outstanding packets, and the switch is executed in block 440.

In the example illustrated in FIG. 3C, at a time (T4) following transmission of Packet 3, the transmit path switch manager 128 determines that there are no outstanding packets associated with the old transmit queues on the transmission queue list 220 (i.e., only Packet A and Packet B remain on the list), in block 480. The transmit path switch manager 128 switches VM1 to the new transmit queue (QN) and transmits Packet A and Packet B from QN, in block 440.

Figure 5:
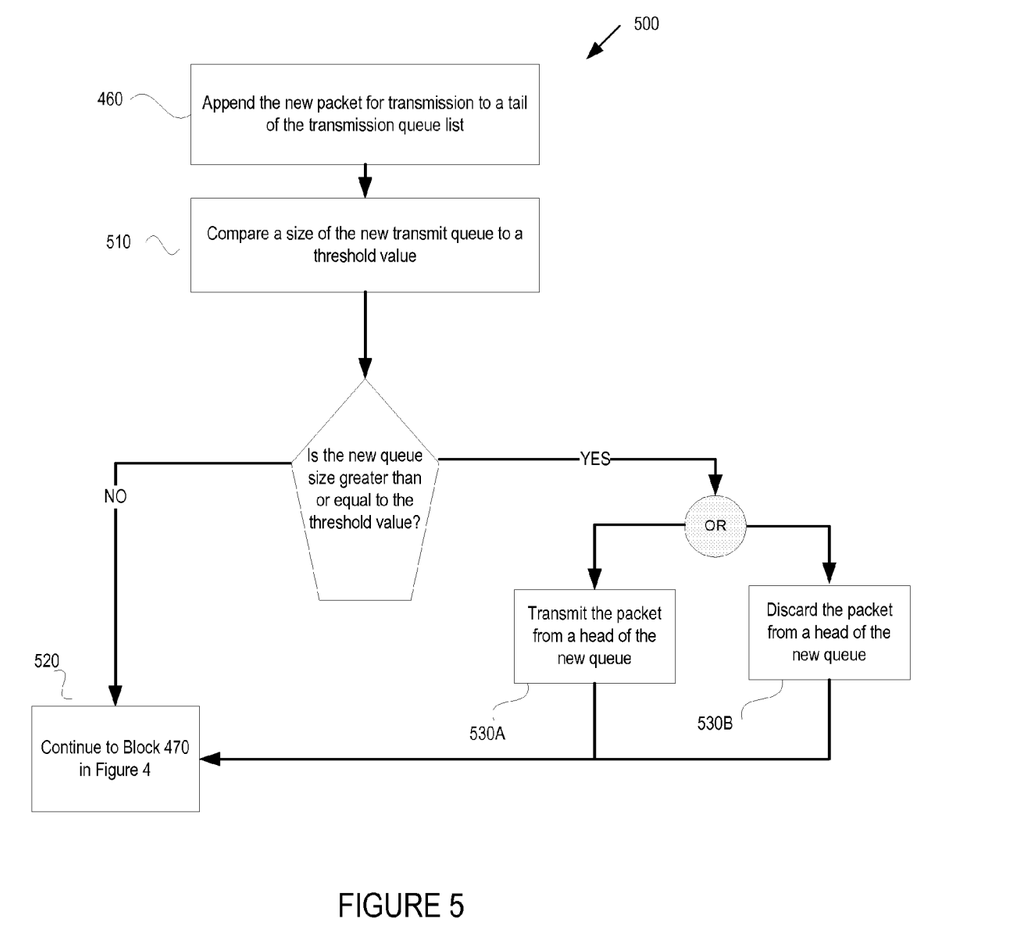
FIG. 5 is a flow diagram of another embodiment of a method for switching transmit queues in a virtual machine system.

FIG. 5 illustrates an optional embodiment of a method for switching transmit queues in a virtual machine system including a check of the size of a new transmit queue to determine whether a capacity of the new transmit queue exceeds a pre-determined threshold. In the embodiment illustrated in FIG. 5, in block 480 (shown in FIG. 4), the transmit path switch manager 128 appends the new packet for transmission to a tail of the transmission queue list 220. In block 510, the transmit path switch manager 128 compares a size of the new transmit queue (including the packets on the transmission queue list 220) to a threshold value. The size of the new transmit queue may be measured in any suitable manner, including, for example, a sum of packet lengths, a number of packets, or a total number of scatter/gather entries. The threshold value could be any metric used by the transmit path switch manager 128 in the comparison with the new queue size, including, but not limited to, a capacity of the new queue.

If the new queue size is less than the threshold value, then method 500 returns to block 470 of method 400, illustrated in FIG. 4. If the new queue size is greater than or equal to the threshold value, the transmit path switch manager 128 may either instruct the network device 150 to transmit a packet from the head of the new queue (in block 530A) or discard a packet from the head of the new queue (in block 530B), prior to returning to block 470 in FIG. 4.

Figure 6:
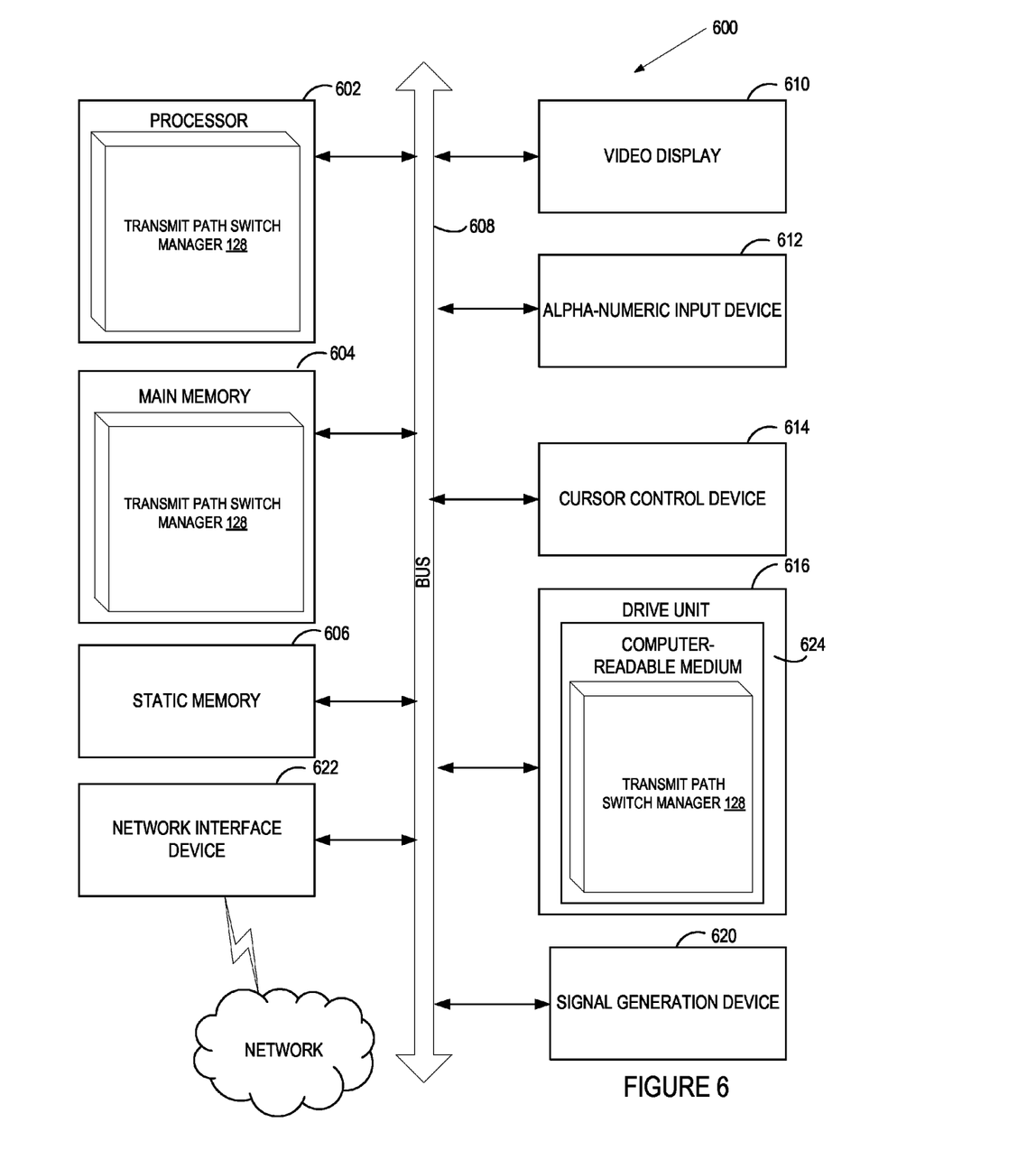
FIG. 6 illustrates a diagrammatic representation of a machine an exemplary transmit queue management system.

FIG. 6 illustrates a diagrammatic representation of a machine in the exemplary form of a computer system 600 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The transmit path switch manager 128 in FIG. 1 may comprise processor 602 configured to perform the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions of the transmit path switch manager 128) embodying any one or more of the methodologies or functions described herein. The instructions of the transmit path switch manager 128 may also reside, completely or at least partially, within the main memory 604 and/or within the processor 602 during execution thereof by the computer system 600, the main memory 604 and the processor 602 also constituting computer-readable media. The instructions of the transmit path switch manager 128 may further be transmitted or received over a network via the network interface device 622.

While the computer-readable storage medium 624 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "generating", "switching", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processor executing a hypervisor, an instruction to switch a plurality of transmit paths associated with a virtual machine from transmitting outgoing packets to at least one destination via a plurality of old transmit queues of a network device to a new transmit queue of the network device;
   after receiving the instruction, identifying a new packet to be transmitted via one of the plurality of old transmit queues of the network device;
   identifying a plurality of outstanding packets transmitted to the old transmit queues of the network device via the plurality of transmit paths, wherein the plurality of outstanding packets have not yet been transmitted by the network device to the at least one destination;
   in response to identifying the new packet and the plurality of outstanding packets, generating, by the processor, a transmission queue list comprising information identifying the old transmit queues associated with the outstanding packets and the new packet, wherein first information identifying the new packet is appended to an end of the transmission queue list, and wherein the transmission queue list comprises a sequence of transmission of the outstanding packets and the new packet by the network device;
   removing a transmitted packet from the transmission queue list in response to transmission of the transmitted packet from the old transmit queue of the network device;
   switching the virtual machine to transmitting via the plurality of old transmit queues to transmitting via the new transmit queue in response to determining the transmission queue list does not comprise the information identifying the old transmit queues associated with the outstanding packets and the new packet; and
   causing transmission of a first packet from the virtual machine via the new transmit queue to the at least one destination.

2. The method of claim 1, further comprising:
   comparing a size of the new transmit queue to a threshold value; and
   transmitting a packet from a head of the new transmit queue upon determining the size of the new transmit queue is greater than or equal to the threshold value.

3. The method of claim 1, further comprising:
   comparing a size of the new transmit queue to a threshold value; and
   discarding a packet from a head of the new transmit queue upon determining the size of the new transmit queue is greater than or equal to the threshold value.

4. The method of claim 1 further comprising,
   discarding one or more packets from a head of the new transmit queue until a size of the new transmit queue matches a threshold value.

5. The method of claim 1, wherein at least one of the old transmit queues is a shared queue and the new transmit queue is a dedicated queue.

6. A non-transitory computer readable storage medium comprising instructions to cause a processor to:
   receive an instruction to switch a plurality of transmit paths associated with a virtual machine from transmitting outgoing packets to at least one destination via a plurality of old transmit queues of a network device to a new transmit queue of the network device;
   after receiving the instruction, identify a new packet to be transmitted via one of the plurality of old transmit queues of the network device;
   identify a plurality of outstanding packets transmitted to the old transmit queues of the network device via the plurality of transmit paths, wherein the plurality of outstanding packets have not yet been transmitted by the network device to the at least one destination;
   in response to identifying the new packet and the plurality of outstanding packets, generate a transmission queue list comprising information identifying the old transmit queues associated with the outstanding packets and the new packet, wherein first information identifying the new packet is appended to an end of the transmission queue list, and wherein the transmission queue list comprises a sequence of transmission of the outstanding packets and the new packet by the network device;

remove a transmitted packet from the transmission queue list in response to transmission of the transmitted packet from the old transmit queue of the network device;

switch the virtual machine to transmitting via the plurality of old transmit queues to transmitting via the new transmit queue in response to determining the transmission queue list does not comprise the information identifying the old transmit queues associated with the outstanding packets and the new packet; and cause transmission of a first packet from the virtual machine via the new transmit queue to the at least one destination.

7. The non-transitory computer readable storage medium of claim 6, comprising instructions to further cause the processor to compare a size of the new transmit queue to a threshold value, and transmit a packet from a head of the new transmit queue when the size of the new transmit queue is greater than or equal to the threshold value.

8. The non-transitory computer readable storage medium of claim 6, comprising instructions to further cause the processor to compare a size of the new transmit queue to a threshold value, and discard a packet from a head of the new transmit queue when the size of the new transmit queue is greater than or equal to the threshold value.

9. The non-transitory computer readable storage medium of claim 6, the processor to discard one or more packets from a head of the new transmit queue until a size of the new transmit queue matches a threshold value.

10. The non-transitory computer readable storage medium of claim 6, wherein the old transmit queue is a shared queue and the new transmit queue is a dedicated queue.

11. A computer system comprising:
a memory to store instructions,
a processor operatively coupled to the memory, the processor to execute the instructions to:
receive an instruction to switch a plurality of transmit paths associated with a virtual machine from transmitting outgoing packets to at least one destination via a plurality of old transmit queues of a network device to a new transmit queue of the network device;
after receiving the instruction, identify, by the processor, a new packet to be transmitted via one of the plurality of old transmit queues of the network device;
identify a plurality of outstanding packets transmitted to the old transmit queues of the network device via the plurality of transmit paths, wherein the plurality of outstanding packets have not yet been transmitted by the network device to the at least one destination;
in response to identifying the new packet and the plurality of outstanding packets, generating, by the processor, a transmission queue list comprising information identifying the old transmit queues associated with the outstanding packets and the new packet, wherein first information identifying the new packet is appended to an end of the transmission queue list, and wherein the transmission queue list comprises a sequence of transmission of the outstanding packets and the new packet by the network device;
remove a transmitted packet from the transmission queue list in response to transmission of the transmitted packet from the old transmit queue of the network device;
switch the virtual machine to transmitting via the plurality of old transmit queues to transmitting via the new transmit queue in response to determining the transmission queue list does not comprise the information identifying the old transmit queues associated with the outstanding packets and the new packet; and
cause transmission of a first packet from the virtual machine via the new transmit queue to the at least one destination.

12. The computer system of claim 11, the processor to: compare a size of the new transmit queue to a threshold value, and transmit a packet from head of the new transmit queue when the size of the new transmit queue is greater than or equal to the threshold value.

13. The computer system of claim 11, the processor to: compare a size of the new transmit queue to a threshold value, and discard a packet from a head of the new transmit queue when the size of the new transmit queue is greater than or equal to the threshold value.

14. The computer system of claim 11, the processor to discard one or more packets from a head of the new transmit queue until a size of the new transmit queue matches a threshold value.

15. The computer system of claim 11, wherein the old transmit queue is a shared queue and the new transmit queue is a dedicated queue.

* * * * *